(12) United States Patent
Momtaz

(10) Patent No.: US 7,099,278 B2
(45) Date of Patent: Aug. 29, 2006

(54) LINE LOOP BACK FOR VERY HIGH SPEED APPLICATION

(75) Inventor: Afshin D. Momtaz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 878 days.

(21) Appl. No.: 09/927,705

(22) Filed: Aug. 10, 2001

(65) Prior Publication Data

US 2003/0031133 A1 Feb. 13, 2003

(51) Int. Cl.
*H04J 1/16* (2006.01)
*H04L 1/14* (2006.01)

(52) U.S. Cl. ............... 370/249; 370/366; 375/221; 375/224

(58) Field of Classification Search ............ 370/248, 370/249, 360, 366, 412, 503, 506; 375/219, 375/220, 221, 224
See application file for complete search history.

(56) References Cited

U.S. PATENT DOCUMENTS

| | | | | |
|---|---|---|---|---|
| 4,748,617 | A * | 5/1988 | Drewlo | 398/98 |
| 5,265,124 | A * | 11/1993 | Staab et al. | 375/211 |
| 5,557,633 | A * | 9/1996 | Staab et al. | 375/213 |
| 5,787,114 | A * | 7/1998 | Ramamurthy et al. | 375/221 |
| 5,956,370 | A * | 9/1999 | Ducaroir et al. | 375/221 |
| 6,397,042 | B1 * | 5/2002 | Prentice et al. | 455/67.14 |
| 6,834,367 | B1 * | 12/2004 | Bonneau et al. | 714/738 |
| 2001/0043648 | A1 * | 11/2001 | Ducaroir et al. | 375/224 |
| 2002/0097682 | A1 * | 7/2002 | Enam et al. | 370/241 |

* cited by examiner

*Primary Examiner*—Alpus H. Hsu
(74) *Attorney, Agent, or Firm*—McAndrews, Held & Malloy

(57) ABSTRACT

Method and circuitry for performing a line loop back test includes a receiver, a deserializer, and a low speed parallel loop back data multiplexer selects either the low speed parallel data from the deserializer when in loop back mode or low speed parallel input data when in normal mode. The deserializer produces a low speed clock output signal that is fed to a low speed loop back reference clock multiplexer and also to a low speed loop back clock multiplexer. Both the loop back reference clock multiplexer and the loop back clock multiplexer select the low speed clock output signal from the deserializer when in line loop back mode. A clock multiplying unit converts the output of the low speed loop back reference clock multiplexer into a high speed clock signal. The serializer generates the high speed serial transmitter data in synchronization with the high speed clock signal received from a clock multiplying unit. A clock divider circuit converts the high speed clock signal from the clock multiplying unit into a low speed FIFO output clock. A first-in-first-out buffer receives the low speed parallel output data in synchronization with a clock multiplexer output, and transmits low speed parallel FIFO data to the serializer in synchronization with the low speed FIFO output clock. A low speed parallel loop back data buffer provides coupling between the deserializer and the low speed parallel loop back data multiplexer, and a low speed loop back clock buffer provides coupling between the deserializer and the loop back reference clock multiplexer and the loop back clock multiplexer.

40 Claims, 4 Drawing Sheets

LINE LOOP BACK FOR VERY HIGH SPEED APPLICATION

BACKGROUND OF THE INVENTION

1. Field of the Invention

The present invention pertains to the field of high speed telecommunications transceivers; and specifically, to the field of testing high speed telecommunication links using the transceiver circuitry.

2. Background of the Invention

In many telecommunications applications, line loop-back mode is used to test the serial high-speed link between two locations. A stream of serial bits is sent over the link, fiber optics for example, to a receiver, which sends it directly to the transmitter and sends it back over the link to the original sender. The sender compares the transmitted and received data, and, if they match, the link must be functional. Such loop-back mode typically requires high speed multiplexers and buffers which are not only very difficult to implement, but also consume a great deal of power and degrade jitter performance of the normal mode operation.

FIG. 1 illustrates general line loop back 100 signal flow. A sender (not shown) sends an optical signal 101 over the link 102. The signal 101 is received by the receiver 103 and passed to the transmitter 105 through a line loop back connection 104 between the receiver 103 and transmitter 105. The transmitter 105 sends an equivalent signal 106 back right away through the link 107. The purpose of the general line loop back mode is to be able to test the links 102 and 107 themselves. The testing sender sends signal 101 then compares the looped back signal 106 to the original signal 101. If the sent signal 101 matches the looped back signal 106, then the lines 102 and 107 are functioning properly. A typical implementation for a line loop back test is on an integrated circuit itself having a receiver 103 and a transmitter 105. The receiver 103 receives the optical serial data on its input 108, converts the data to a lower speed parallel form, and then sends the lower speed parallel data through parallel output port 109 to another application specific integrated circuit (not shown) which performs further processing on the parallel data. Typically, either the same or another application specific integrated circuit feeds the transmitter 105 lower speed parallel data through input port 110.

As is apparent from the above discussion, a need exists for a telecommunications circuit suitable for transceivers that provides for cost-effective and efficient implementation of the line loop back test which is not difficult to implement, conserves power, and which does not adversely affect the jitter performance of normal mode transceiver operation.

BRIEF SUMMARY OF THE INVENTION

Transceiver telecommunications circuits at the ends of bi-directional communications links must be capable of implementing line loop back tests. Some conventional implementations of the line loop back are inefficient and complex, consume large amounts of power, and adversely affect the jitter performance of normal mode transceiver operation.

In order to overcome these problems, the present invention offers a novel approach that does not require such high-speed multiplexers and buffers. Once the serial data is received, clock is extracted and data is recovered. The recovered data is deserialized to low speed parallel data and clock. This low speed parallel clock and data are then looped back to the transmitter section to be serialized into high-speed serial data. The implementation according to the present invention is quite attractive for applications that already have clock and data recovery, and deserializer and serializer blocks, and therefore no additional high-speed blocks are required for loop-back. According to the present invention, all the multiplexers and buffers are low speed multiplexers and buffers.

An additional advantage of the implementation according to the present invention is that there are fewer high-speed blocks than the conventional implementation. High frequency noise travels much more easily through the substrate than low frequency noise, and hence the implementation according to the present invention has reduced noise coupling effects as compared to conventional implementations. Moreover, according to the present invention, not only is the link tested, but also the functionality of the transmitter and receiver are verified.

The present invention is equally applicable to a system having a separate transmitter and receiver as well as an integrated transceiver version, having a transmitter and receiver. For example, one such application involves a ten gigabits per second (10 Gbps) transceiver with a sixteen-to-one serializer and a one-to-sixteen deserializer using standard complementary metal oxide silicon process (CMOS). Implementing 10 Gbps multiplexers in CMOS is difficult and very power hungry, whereas 625 Mbps (10 Gbps divided by 16) multiplexers are quite feasible and relatively easy to implement. The method according to the present invention can also be used for 40 Gbps transceivers in Silicon Germaninum (SiGe) or Gallium Arsenide (GaAs) processes.

According to the present invention, a circuit for performing a line loop back test includes a receiver that receives an input signal from a receiver communication line, a deserializer that converts high speed serial receiver data into low speed parallel data, and a low speed parallel loop back data multiplexer that selects either the low speed parallel data from the deserializer when in loop back mode or low speed parallel input data when in normal mode. A clock and data recovery provides coupling between the receiver and the deserializer. A serializer converts low speed parallel output data from the low speed parallel loop back data multiplexer into high speed serial transmitter data. A transmitter converts the high speed serial transmitter data into an output signal for transmission across a transmitter communication line.

In a specific embodiment, the deserializer further produces a low speed clock output signal, and the circuit further includes a low speed loop back reference clock multiplexer that selects either the low speed clock output signal from the deserializer when in line loop back mode or a reference clock input signal when in normal mode. According to the present invention, the circuit further includes a clock multiplying unit that converts a low speed output of the low speed loop back reference clock multiplexer into a high speed clock signal. The serializer generates the high speed serial transmitter data in synchronization with the high speed clock signal received from the clock multiplying unit. A first-in-first-out buffer coupled to the serializer provides coupling between the serializer and the low speed parallel loop back data multiplexer, and a low speed loop back clock multiplexer selects either the low speed clock output signal from the deserializer or a low speed clock input signal for transmission to the first-in-first-out buffer. A clock divider circuit converts the high speed clock signal from the clock multiplying unit into a low speed FIFO output clock. The first-in-first-out buffer receives the low speed parallel output data in synchronization with a clock multiplexer output, and transmits low speed parallel FIFO data to the serializer in synchronization with the low speed FIFO output clock.

In another embodiment, a low speed parallel loop back data buffer provides coupling between the deserializer and the low speed parallel loop back data multiplexer, and low speed loop back clock buffer provides coupling between the deserializer and the low speed loop back reference clock multiplexer and provides coupling between the deserializer and the low speed loop back clock multiplexer.

These and other features, aspects, and advantages of the present invention will be apparent from the Detailed Description of the Invention in conjunction with the Figures.

The Figures are more fully explained in narrative form in the Detailed Description of the Invention.

DETAILED DESCRIPTION OF THE INVENTION

Figure 1:
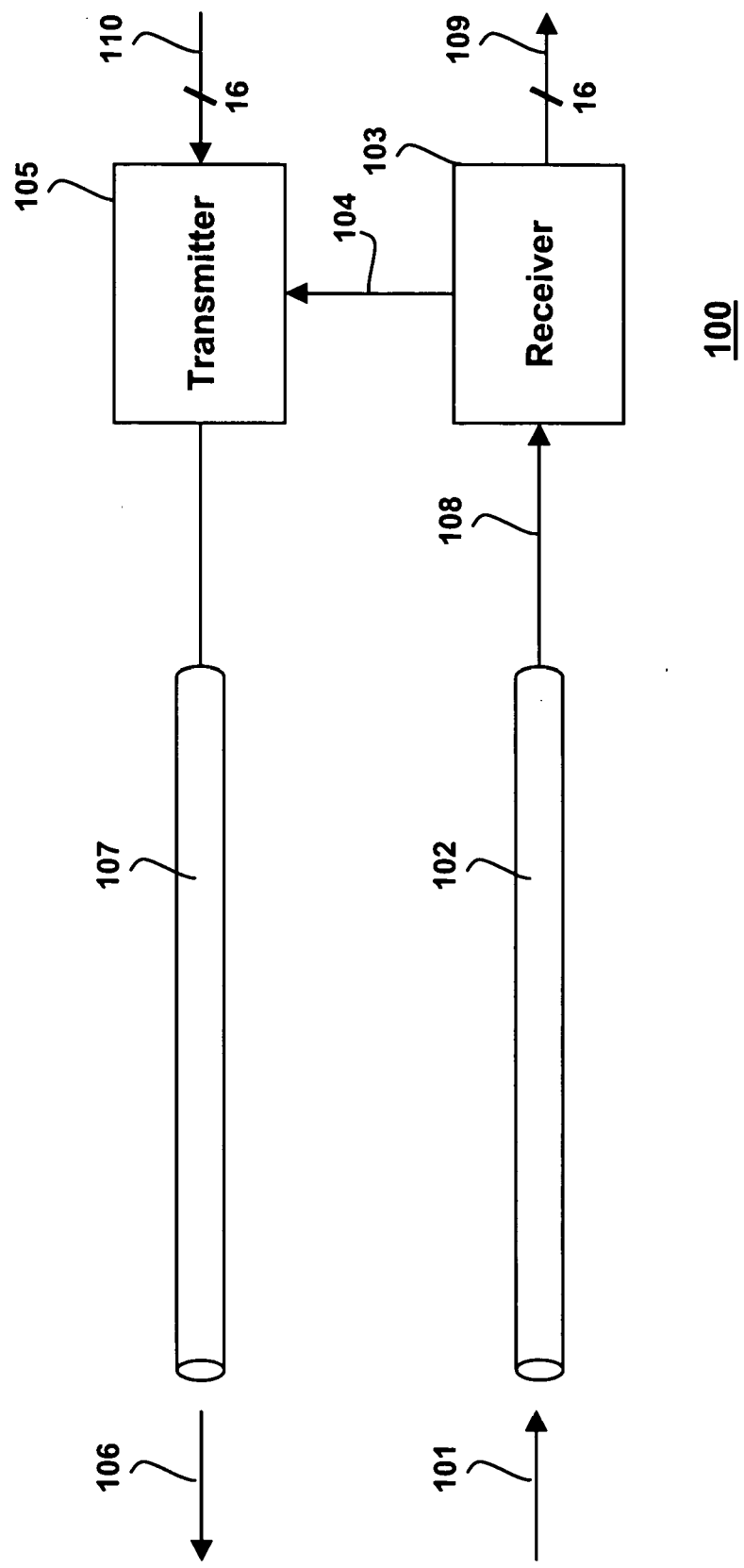
FIG. 1 illustrates the concept of a line loop back test addressed by the present invention.

Transceiver circuitry must have the capability to test bi-directional communication links to which they are connected. FIG. 1 illustrates the concept of a line loop back test addressed by the present invention. In some applications, there are separate integrated circuits that implement the receiver 103 and the transmitter 105, and also separate integrated circuits that perform the low speed upstream and downstream processing. In other applications, there is a single integrated circuit that acts as a transceiver and another single integrated circuit that receives and transmits lower speed parallel data. Other combinations are also possible. Ultimately, all of the high speed transceiver circuitry and lower speed parallel circuitry can be implemented on a single chip. Therefore, the separation of the various components can be arbitrarily partitioned. In the embodiment described herein, however, all of the circuitry required to implement the present invention is placed on the same integrated circuit.

Figure 2:
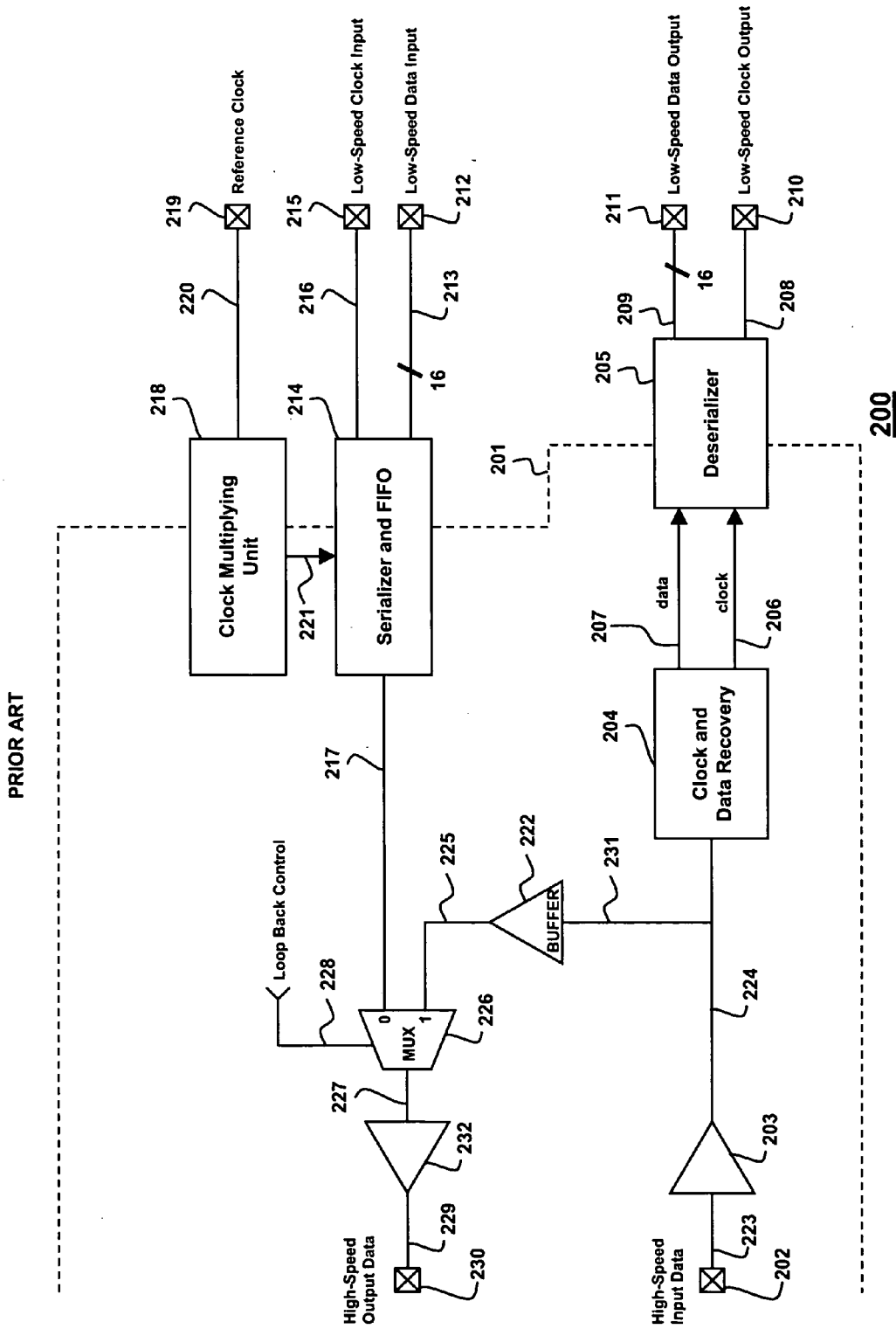
FIG. 2 illustrates a conventional implementation of line loop back test on an integrated circuit.

FIG. 2 illustrates a conventional implementation of the general line loop back mode in which all of the high speed serial circuitry (to the left of dotted line 201) and lower speed parallel circuitry (to the right of dotted line 201) is integrated onto a single integrated circuit 200. Inside the integrated circuit 200, the input pad 202 generates a high-speed input signal 223 that feeds a high-speed input receiver 203. The output of the high speed input receiver 203 is a single signal 224 that has both clock and data encoded on it. A clock and data recovery unit (CDR) 204 receives the output 224 of the input receiver 203 and extracts the high frequency clock 206 and the high frequency data 207 and sends them to a deserializer 205 which converts the serial high frequency clock 206 and data 207 into a lower frequency clock signal 208 and a lower frequency parallel data signal 209. For example, the high speed clock 206 is preferably nearly 10 GHz and the serial data 207 is at nearly 10 Gbps. The lower speed parallel data 209 is then typically 16 lines at 622 Mbps, with a low-speed clock 208 also at 622 MHz. Output pads 210 and 211 communicate the low speed clock output 208 and low speed data outputs 209 to other circuitry.

A sixteen to one conversion ratio is very typical. The transmitter is very similar to the receiver. Through low speed data input pads 212, sixteen parallel low speed bits 213 are transmitted from an outside source to the serializer and first in first out buffer (FIFO) 214. Through a low speed clock pad 215 a low speed clock signal 216 is transmitted to the serializer and FIFO 214. The serializer 214 takes, for example, sixteen data signals at 622 Mbps and creates one high speed 10 Gbps signal 217. The clock multiplying unit CMU 218 receives a reference clock signal 220 from an input pad 219 driven, for example, by an external oscillator (not shown). The reference clock signal 220 is, for example, at 622 MHz and is multiplied up in order to generate a 10 GHz reference clock signal output 221.

In a conventional application, as soon as the serial receiver 203 receives the input signal 223 from the input pad 203, a buffer 222 amplifies received signal 224 to produce a high speed loop back signal 225 that is one of the inputs to a high speed multiplexer 226. The high speed multiplexer 226 selects either the output 217 of the serializer and FIFO 214 or the high speed loop back signal 225 to transmit to its output 227 depending upon the binary value of a loop back control signal 228. When the loop back control signal 228 is high, loop back mode is selected and high speed loop back signal 225 is communicated to the output 227 of the multiplexer 226. When the loop back control signal 228 is low, normal mode is selected and the output 217 of the serializer and FIFO 214 is transmitted to the multiplexer output 227. The loop back control signal can be generated either internally on the integrated circuit 200 or directly received from a separate input pad (not shown). The output 227 of the multiplexer 226 is amplified by a driver 232 to create a high speed output data signal 229 that drives a high speed output pad 230.

The problem with the conventional implementation of line loop back illustrated in FIG. 2 is that the buffer 222 and multiplexer 226 used to implement the line loop back mode are in the high speed portions of the circuit to the left of dotted line 201. The input 231 of the buffer 222 is adding capacitive load which slows down the buffer 203. This slow down can distort the shape of the signal 224 which would lead to the clock and data recovery unit 204 performance degradation. Moreover, even though the multiplexer 226 that selects between the normal mode output signal 217 and the loop back mode output signal 225 is asynchronous circuitry, it is in the high speed critical path, and therefore again slows down operation of the circuit even when the circuit 200 is being used in the normal mode.

A problem with the conventional implementation of line loop back using the buffer 222 and multiplexer 226 in the high speed portion of the circuit is that it consumes more power and degrades the jitter performance. Moreover, implementing the multiplexer 226 and buffer 222 in the high speed portion of the circuit becomes extremely challenging, especially in standard silicon processes, because the circuit is operating near the technological limit of the maximum speed.

Figure 3:
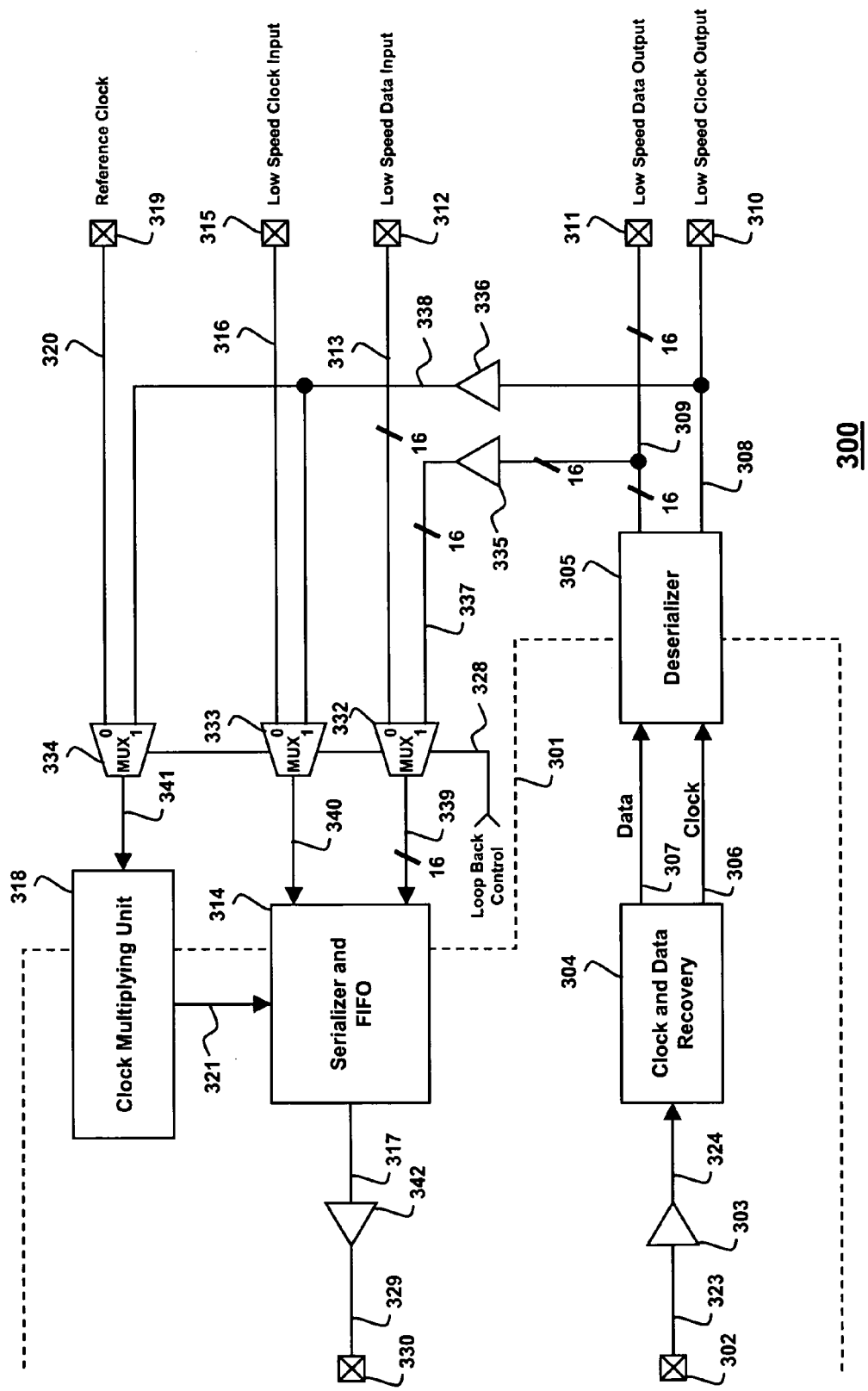
FIG. 3 illustrates an implementation according to the present invention of an integrated circuit which is capable of performing a line loop back test.
Figure 4:
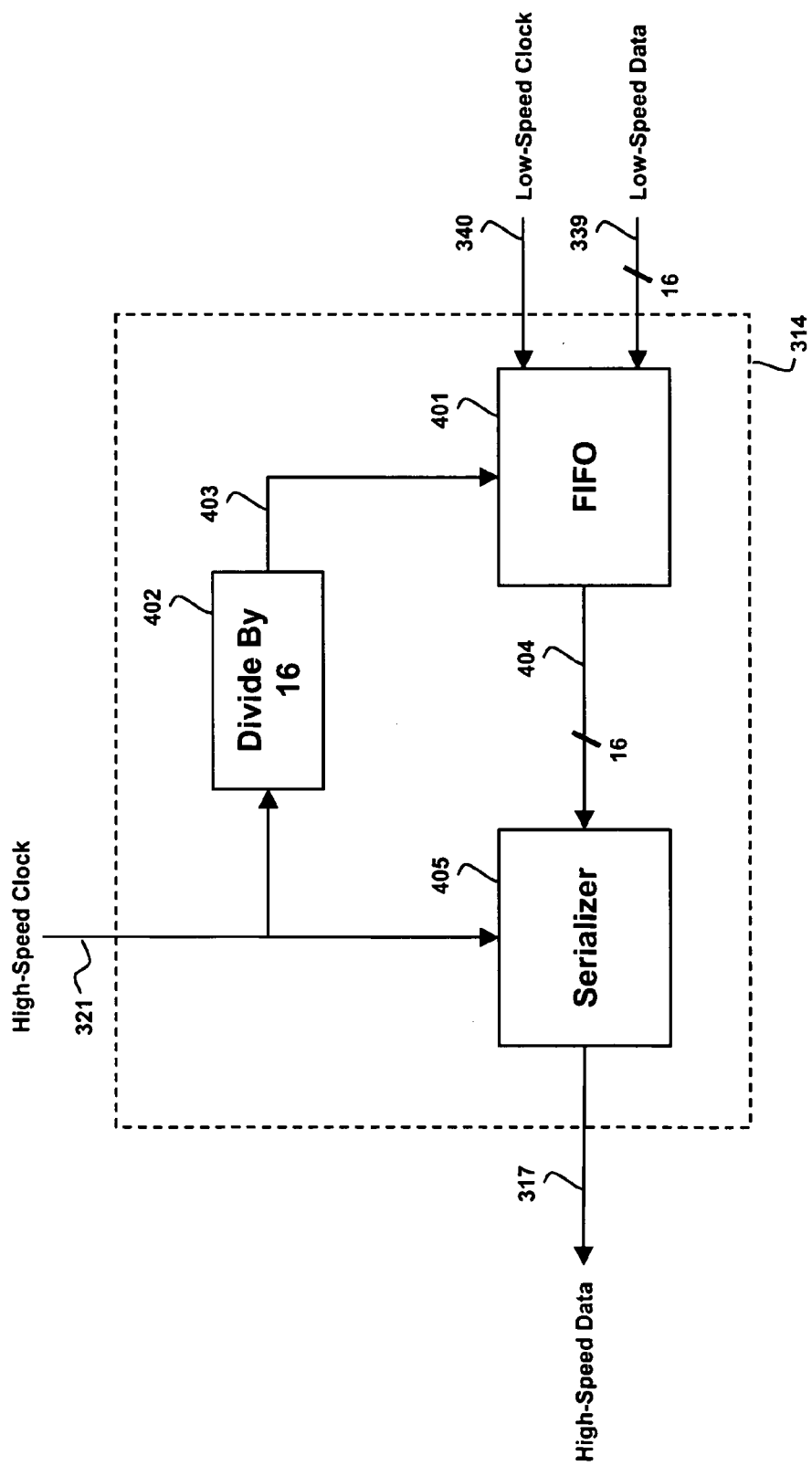
FIG. 4 illustrates an implementation of the serializer and first-in-first-out buffer such as shown in the implementation of an integrated circuit according to the present invention shown in FIG. 3 which is capable of performing a line loop back test.

FIG. 3 illustrates an integrated circuit 300 designed in accordance with an exemplary embodiment of the present invention. The purpose of line loop back mode is to test the link. In this embodiment, all of the high speed serial circuitry (to the left of dotted line 301) and lower speed parallel circuitry (to the right of dotted line 301) is integrated onto a single integrated circuit 300. Inside the integrated circuit 300, the input pad 302 generates a high-speed input signal 323 that feeds a high-speed input receiver 303. The output of the high speed input receiver 303 is a single signal 324 that has both clock and data encoded on it. A clock and data recovery unit (CDR) 304 receives the output 324 of the input receiver 303 and extracts the high frequency clock 306 and the high frequency data 307 and sends them to a deserializer 305 which converts the serial high frequency clock 306 and data 307 into a lower frequency clock signal 308 and a lower frequency parallel data signal 309. For example, the high speed clock 306 is preferably nearly 10 GHz and the serial data 307 is at nearly 10 Gbps. The lower speed parallel data 309 is then typically 16 lines at 622 Mbps, with a the low-speed clock 308 also at 622 MHz. Output pads 310 and 311 communicate the low speed clock output 308 and low speed data outputs 309 to other circuitry.

Through low speed data input pads 312, sixteen parallel low speed bits 313 are transmitted from an outside source to a low speed data multiplexer 332. Through a low speed clock pad 315 a low speed clock signal 316 is transmitted to a low speed clock multiplexer 333. A reference clock multiplexer 334 receives a reference clock signal 320 from an input pad 319 driven, for example, by an external oscillator (not shown).

According to the present invention, the sixteen-bit-wide low speed data multiplexer 332, low speed clock multiplexer 333, and low speed reference clock multiplexer 334 implement the loop back mode in conjunction with the normal mode functioning of the high speed circuitry left of the dotted line in FIG. 3. In the exemplary embodiment shown, the low speed data output signals 309 are amplified by a sixteen-bit-wide loop back data buffer 335 in order to produce a sixteen-bit-wide loop back data signal 337; and, similarly, the low speed clock output 308 is amplified by a loop back clock buffer 336 in order to produce a loop back clock signal 338. However, it is to be understood that the loop back data buffer 335 and loop back clock buffer 336 may not be necessary in all implementations. For example, if the output drivers (not shown) within the deserializer 305 that drive the low speed data output signals 309 are strong enough and the physical routing from the deserializer 305 to the low speed loop back multiplexers 332, 333, and 334 is short enough, the loop back buffers 335 and 336 can be omitted (thus replaced by simple wires in the illustration of FIG. 3).

Loop back mode is selected when the loop back control signal 328 is high. In loop back mode, loop back data signals 337 are used to generate the output signal 339 of the low speed loop back data multiplexer 332. Similarly, in loop back mode, the loop back clock signal 338 is used to generate the outputs 340 and 341 of the low speed clock multiplexer 333 and low speed reference clock multiplexer 334, respectively. In contrast, during normal mode, when the loop back control signal 328 is low, the low speed data input signal 313 is used by the low speed loop back data multiplexer to generate its output 339. Similarly, in normal mode, the low speed clock multiplexer 333 uses the low speed clock input signal 316 to generate its output 340, and the reference clock multiplexer 334 uses the reference clock signal 320 to generate its output 341.

The serializer and first in first out buffer (FIFO) 314 takes sixteen data signals 339 at 622 Mbps from the loop back data multiplexer 332 and creates one high speed 10 Gbps signal 317, which is used as input for driver 342 to create a high speed output data signal 329 that drives a high speed output pad 330.

The clock multiplying unit (CMU) 318 receives a reference clock signal 341 from the loop back reference clock multiplexer 334 and multiplies the signal 341 in frequency in order to generate a 10 GHz reference clock signal output 321.

According to the present invention, the loop back multiplexing of the clock and data is not done in the high speed circuitry which is limiting the performance of the circuit. Instead, it is performed in the low speed portion of the circuit (to the right of the dotted line 301) in which speed is not an issue. Even though the loop back multiplexing in the low speed portion of the circuit still increases propagation delays, thereby slowing down the maximum frequency at which the low speed circuitry can operate, the speed at which the low speed circuitry can operate is still well above the low speed requirement. Moreover, if the loop back multiplexing did slow down the low speed circuitry below its required operating frequency, the low speed circuitry could be further pipelined in order to increase its operating frequency to a level above the speed requirement of the application.

According to the present invention, a significant amount of power is saved over conventional implementations of line loop back. At conventional operating frequencies, the conventional loop back implementation 200 shown in FIG. 2 is really pushing the technology in order to achieve the high speed requirement. Generally, the relationship between current (power) and speed in any given technology is linear with a constant slope up until high frequencies approaching the technological limit of the given technology, at which point the slope of the relationship continuously diminishes, such that increasing power results in a less-than-proportional increase in speed. Thus, the conventional implementation 200 of line loop back must operate in the region of diminishing returns of speed with respect to power in order to achieve the high speed requirement. In contrast, in the implementation 300 shown in FIG. 3 according to the present invention, the line loop back is accomplished in the linear region of operation in which an increase in power results in a proportional increase in speed.

The serializer and first in first out buffer 314 performs synchronization between the low speed clock 316 and reference clock 320. The low speed data 313 comes into the integrated circuit 300 synchronized with the low speed clock 316, such that the data 313 is time-aligned with the low speed clock 316. However, to transmit high speed data off the integrated circuit 300 through output pad 330, another clock 321 is used that is generated on chip using the clock multiplying unit 318. There is not necessarily any timing relationship between the reference clock 320 and the low speed clock 316; they can be completely independent. Data must be transferred from the time domain of the low speed clock 316 to the time domain of the reference clock 320.

The role of the first in first out buffer (FIFO) 401 is to transfer data from the time domain of the low speed clock 316 to the time domain of the reference clock 320. The low speed data 339 is clocked into the first in first out buffer 401 by the low speed clock 340 at about 622 MHz. The high speed clock 321 created by the clock multiplying unit 318 is at about 10 GHz, and is divided down to a 622 MHz clock 403 that is time-aligned with the high-speed clock 321 that was derived from the low speed reference clock 319. Low speed data 404 is clocked out of the first in first out buffer 401 by the low speed clock 403 that is time aligned with the reference clock 319. Finally, serializer 405 converts the low speed data 404 into high speed data 317.

In normal mode, the receiver and the transmitter can operate at different frequencies. The clock 308 derived from the incoming high-speed data is a measure of the receiver frequency. The reference clock 320 is a measure of the transmitter frequency. There is a limit of how far off the receiver and transmitter frequencies can be. For a typical application, the frequencies can be off by around 4.6 ppm (parts per million). But for some applications the frequencies can be off by about 100 ppm. The reference clock 320 comes from a crystal (not shown) which is typically on the same circuit board as the integrated circuit 300. In contrast, the low speed clock 308 is derived from a far end transmitter that is transmitting the high speed data to the receiver that will have a different crystal. Because there are two separate crystals, there is a different frequency between the two signals.

However, during the line loop back mode according to the present invention, there are not two different frequencies, because the same low speed clock signal 308 is buffered and the buffered clock signal 338 is selected by both the loop back clock multiplexer 333 and the loop back reference clock multiplexer 334.

According to the present invention, during line loop back mode, instead of using a reference clock 320 that comes externally from a crystal, the same low speed clock 308 that was extracted is buffered, multiplexed, and sent to the clock multiplying unit 318, which locks to the frequency from the received signal. Thus, in the line loop back mode, the transmitter and receiver are locked to the same frequency.

The prior art was using one buffer and one multiplexer at very high speed. According to the exemplary embodiment of the present invention described herein, seventeen low speed buffers are used: sixteen for the data, and one for the clock; in addition eighteen low speed multiplexers are used: sixteen for the data, one for the low speed clock, and one for the reference clock.

An advantage of the implementation 300 according to the present invention over the conventional implementation 200 is current (and thus power) consumption. Another advantage is that the high speed performance is not affected by the circuitry that implements the line loop back mode. The performance is measured by the amount of jitter that is generated. The amount of jitter increases each time the high speed signal goes through a block. Therefore, according to the present invention, the number of blocks is reduced from the conventional implementation. For example, removing the high speed multiplexer 226 helps the jitter performance substantially.

Yet another advantage of the present invention is noise reduction. In one embodiment of the present invention, all the circuits are sitting on the same silicon substrate. All of the blocks are going to generate noise. That noise is going to couple to the substrate that the whole chip is sitting on. Moreover, higher frequency noise travels through the substrate more readily. According to the present invention, the number of blocks that are running at high frequency is reduced in comparison to the conventional approach, and therefore, the amount of high frequency noise that is introduced into the substrate is reduced. The blocks that were removed from the high frequency portion of the circuit in the conventional implementation are added to the low frequency portion of the circuit according to the present invention. From a noise coupling point of view, the implementation according to the present invention is a far superior implementation than the conventional implementation because the number of the 10 GHz (high frequency) blocks has been reduced. The noise coupling affects the high speed portions of the circuit more than the low speed portions of the circuit. Because there is less high speed circuitry according to the present invention than in conventional implementations, there is less noise sensitive circuitry as well.

According to the present invention, there is less total noise as well. The noise is split into two groups: there are noise generators and noise receivers. The noise generators are basically every block that is added, but the high frequency blocks are the worst noise generators. The noise receivers are basically every block, but the high frequency blocks are more sensitive to receiving noise. Because the number of high frequency blocks is reduced according to the present invention in comparison to the conventional implementation, the number of the worst noise generators and the number of circuits most sensitive to the noise are both reduced.

The implementation of the line loop back according to the present invention incurs a slight amount of additional delay as compared to the conventional implementation because the signal is converted to low speed parallel and then reconverted back into high speed serial. However, it is assumed that the lines being tested are of an arbitrary long length, and thus the tester performing the line loop back test is not expecting the data back at any particular time. The time between transmission and receipt by the tester is flexible. When the tester receives the data, he keeps delaying it until he finds a match between the stream that is sent and the stream that he receives. The amount of the roundtrip delay through the lines is in large part a function of the length of the cable itself which can vary a lot, for example, from 100 meters to 80 kilometers. Hence a few clock cycles needed to convert to low speed and reconvert to high speed is small in comparison to the delay incurred in the line itself.

The line loop back implementation according to the present invention can be used in many contexts. For example, the line loop back can be used when a transmitter and receiver are implemented separately because this can be implemented on a single board with separate chips rather than on a single chip. Alternatively, the present invention can be implemented as a transceiver, as illustrated in FIG. 3, because all of the components can be implemented on a single chip, and therefore no extra external pins are required. As another alternative, the line loop back according to the present invention can be implemented when the circuit is integrated with the entire application integrated circuit (or circuits) that receive the low-speed data output from pads 311 and supply the low speed data input through pins 312.

The present invention is particularly suitable within the parameters of having a receiver and transmitter that are similar to serial optical network (SONET) or Gigabit internet applications where there is a receiver that goes to a clock and data recovery unit and then to a deserializer. If the above described receiver/CDR/deserializer architecture does not exist, for example, if some processing is done more than simple deserializing, then it may be difficult to loop it back properly unless the exact inverse circuitry exists in the transmitter direction. In the embodiment shown in FIG. 3, because the transmitter and receiver processing are exact inverses of one another, all that was necessary to implement the present invention is a few multiplexers (and perhaps buffers).

While the present invention has been described with reference to its preferred and alternative embodiments, those embodiments are offered by way of example, not by way of limitation. Those skilled in the art will be enabled by this disclosure to make various additions, deletions, and modifications to the present invention. Accordingly, all such additions, deletions, and modifications are deemed to lie within the spirit and scope of the present invention as delineated in the appended claims.

What is claimed is:

1. A circuit for performing a line loop back test, the circuit comprising:
a receiver that receives an input signal from a receiver communication line;
a deserializer coupled to the receiver that converts high speed serial receiver data derived from an input signal received by the receiver into low speed parallel data, wherein the deserializer further produces a low speed clock output signal;
a low speed parallel loop back data multiplexer coupled to the deserializer that selects either the low speed parallel data from the deserializer or low speed parallel input data;
a serializer coupled to the low speed parallel loop back data multiplexer that converts low speed parallel output data from the low speed parallel loop back data multiplexer into high speed serial transmitter data;
a transmitter coupled to the serializer that converts the high speed serial transmitter data into an output signal for transmission across a transmitter communication line; and
a low speed loop back reference clock multiplexer coupled to the deserializer that selects either the low speed clock output signal from the deserializer or a reference clock input signal.

2. A circuit as in claim 1, further comprising:
a clock multiplying unit coupled to the low speed loop back reference clock multiplexer and the serializer that converts a low speed output of the low speed loop back reference clock multiplexer into a high speed clock signal;
wherein the serializer generates the high speed serial transmitter data in synchronization with the high speed clock signal received from the clock multiplying unit.

3. A circuit as in claim 2, further comprising:
a first-in-first-out buffer coupled to the serializer that provides coupling between the serializer and the low speed parallel loop back data multiplexer; and
a low speed loop back clock multiplexer coupled to the first-in-first-out buffer that selects either the low speed clock output signal from the deserializer or a low speed clock input signal; and
a clock divider circuit coupled to the first-in-first-out buffer that converts the high speed clock signal from the clock multiplying unit into a low speed FIFO output clock;
wherein the first-in-first-out buffer receives the low speed parallel output data from the low speed parallel loop back data multiplexer in synchronization with a clock multiplexer output received from the low speed clock multiplexer;
wherein the first-in-first-out buffer transmits low speed parallel FIFO data to the serializer in synchronization with the low speed FIFO output clock received from the clock divider.

4. A circuit as in claim 3, further comprising:
a low speed loop back clock buffer that provides coupling between the deserializer and the low speed loop back reference clock multiplexer, and that provides coupling between the deserializer and the low speed loop back clock multiplexer.

5. A circuit as in claim 1, further comprising:
a low speed parallel loop back data buffer that provides coupling between the deserializer and the low speed parallel loop back data multiplexer.

6. A circuit as in claim 1, further comprising:
a low speed loop back clock buffer that provides coupling between the deserializer and the low speed loop back reference clock multiplexer.

7. A circuit as in claim 1, further comprising:
a clock and data recovery unit that provides coupling between the receiver and the deserializer.

8. A circuit for performing a line loop back test, the circuit comprising:
a serializer that receives a serializer parallel data input signal and that generates a serializer serial data output signal;
a first-in-first-out buffer having a FIFO parallel data input signal and a FIFO parallel data output signal;
a loop back data multiplexer that receives a loop back data multiplexer parallel data input signal and a loop back data multiplexer parallel loop back input signal and that generates a loop back data multiplexer parallel data output signal;
a loop back data buffer that receives a loop back data buffer parallel input signal and that generates a loop back data buffer parallel output signal;
a deserializer that receives a deserializer serial data input signal and that generates a deserializer parallel data output signal, wherein the deserializer further generates a deserializer clock output signal; and
a loop back reference clock multiplexer that receives a loop back reference clock multiplexer reference clock input signal and a loop back reference clock multiplexer loop back input signal and that generates a loop back reference clock multiplexer clock output signal;
wherein the deserializer parallel data output signal is coupled to the loop back data buffer parallel input signal;
wherein the loop back data buffer parallel output signal is coupled to the loop back data multiplexer parallel loop back input signal;
wherein the loop back data multiplexer parallel data output signal is coupled to the FIFO parallel data input signal;
wherein the FIFO parallel data output signal is coupled to the serializer parallel data input signal;
wherein the deserializer clock output signal is coupled to the loop back reference clock multiplexer loop back input signal.

9. A circuit as in claim 8, further comprising:
a clock multiplier unit that receives a clock multiplier unit input signal and that generates a clock multiplier unit output signal;
wherein the serializer further receives a serializer clock input signal;
wherein the clock multiplier unit output signal is coupled to the serializer clock input signal.

10. A circuit as in claim 9,
wherein the loop back reference clock multiplexer clock output is coupled to the clock multiplier unit input signal.

11. A circuit as in claim 10, further comprising:
a loop back clock buffer that receives a loop back clock buffer input signal and that produces a loop back clock buffer output signal;

wherein the loop back clock buffer output signal is coupled to the loop back reference clock multiplexer loop back input signal; and wherein the deserializer clock output signal is coupled to the loop back clock buffer input signal to provide the coupling of the deserializer clock output signal to the loop back reference clock multiplexer loop back input signal.

12. A circuit as in claim 11, further comprising:

a loop back clock multiplexer that receives a loop back clock multiplexer clock input signal and a loop back clock multiplexer loop back input signal and that generates a loop back clock multiplexer output signal;

wherein the first-in-first-out buffer further receives a FIFO input clock signal;

wherein the loop back clock multiplexer output signal is coupled to the FIFO input clock signal;

wherein the loop back buffer output signal is coupled to the loop back clock multiplexer loop back input signal.

13. A circuit as in claim 12, further comprising:

a clock divider that receives a clock divider input signal and that generates a clock divider output signal;

wherein the first-in-first-out buffer further receives a FIFO output clock signal;

wherein the clock divider input signal is coupled to the loop back reference clock multiplexer output signal;

wherein the clock divider output signal is coupled to the FIFO output clock signal.

14. A circuit as in claim 12, further comprising:

a loop back control signal;

wherein the loop back reference clock multiplexer further receives a loop back reference clock multiplexer select signal;

wherein the loop back clock multiplexer further receives a loop back clock multiplexer select signal;

wherein the loop back data multiplexer further receives a loop back data multiplexer select signal;

wherein the loop back control signal is coupled to the loop back reference clock multiplexer select signal, the loop back clock multiplexer select signal, and the loop back data multiplexer select signal.

15. A circuit as in claim 14, wherein when the loop back control signal is asserted, the loop back reference clock multiplexer is operative to communicate the loop back reference clock multiplexer loop back input signal to the loop back reference clock multiplexer output signal, the loop back clock multiplexer is operative to communicate the loop back clock multiplexer loop back input signal to the loop back clock multiplexer output signal, and the loop back data multiplexer is operative to communicate the loop back data multiplexer parallel loop back input signal to the loop back data multiplexer parallel data output signal; and wherein when the loop back control signal is deasserted, the loop back reference clock multiplexer is operative to communicate the loop back reference clock multiplexer reference clock input signal to the loop back reference clock multiplexer output signal, the loop back clock multiplexer is operative to communicate the loop back clock multiplexer clock input signal to the loop back clock multiplexer output signal, and the loop back data multiplexer is operative to communicate the loop back data multiplexer parallel data input signal to the loop back data multiplexer parallel data output signal.

16. A circuit for performing a line loop back test, the circuit comprising:

a serializer that receives a serializer parallel data input signal and that generates a serializer serial data output signal;

a first-in-first-out buffer having a FIFO parallel data input signal and a FIFO parallel data output signal;

a loop back data multiplexer that receives a loop back data multiplexer parallel data input signal and a loop back data multiplexer parallel loop back input signal and that generates a loop back data multiplexer parallel data output signal;

a deserializer that receives a deserializer serial data input signal and that generates a deserializer parallel data output signal, wherein the deserializer further generates a deserializer clock output signal; and a loop back reference clock multiplexer that receives a loop back reference clock multiplexer reference clock input signal and a loop back reference clock multiplexer loop back input signal and that generates a loop back reference clock multiplexer clock output signal;

wherein the deserializer parallel data output signal is coupled to the loop back data multiplexer parallel loop back input signal;

wherein the loop back data multiplexer parallel data output signal is coupled to the FIFO parallel data input signal;

wherein the FIFO parallel data output signal is coupled to the serializer parallel data input signal;

wherein the deserializer clock output signal is coupled to the loop back reference clock multiplexer loop back input signal.

17. A circuit as in claim 16, further comprising:

a clock multiplier unit that receives a clock multiplier unit input signal and that generates a clock multiplier unit output signal;

wherein the serializer further receives a serializer clock input signal;

wherein the clock multiplier unit output signal is coupled to the serializer clock input signal.

18. A circuit as in claim 17, wherein the loop back reference clock multiplexer clock output is coupled to the clock multiplier unit input signal.

19. A circuit as in claim 18, further comprising:

a loop back clock multiplexer that receives a loop back clock multiplexer clock input signal and a loop back clock multiplexer loop back input signal and that generates a loop back clock multiplexer output signal;

wherein the first-in-first-out buffer further receives a FIFO input clock signal;

wherein the loop back clock multiplexer output signal is coupled to the FIFO input clock signal;

wherein the deserializer clock output signal is coupled to the loop back clock multiplexer loop back input signal.

20. A circuit as in claim 19, further comprising:

a clock divider that receives a clock divider input signal and that generates a clock divider output signal;

wherein the first-in-first-out buffer further receives a FIFO output clock signal;

wherein the clock divider input signal is coupled to the loop back reference clock multiplexer output signal;

wherein the clock divider output signal is coupled to the FIFO output clock signal.

21. A circuit as in claim 19, further comprising:
a loop back control signal;
wherein the loop back reference clock multiplexer further receives a loop back reference clock multiplexer select signal;
wherein the loop back clock multiplexer further receives a loop back clock multiplexer select signal;
wherein the loop back data multiplexer further receives a loop back data multiplexer select signal;
wherein the loop back control signal is coupled to the loop back reference clock multiplexer select signal, the loop back clock multiplexer select signal, and the loop back data multiplexer select signal.

22. A circuit as in claim 21,
wherein when the loop back control signal is asserted,
the loop back reference clock multiplexer is operative to communicate the loop back reference clock multiplexer loop back input signal to the loop back reference clock multiplexer output signal,
the loop back clock multiplexer is operative to communicate the loop back clock multiplexer loop back input signal to the loop back clock multiplexer output signal, and
the loop back data multiplexer is operative to communicate the loop back data multiplexer parallel loop back input signal to the loop back data multiplexer parallel data output signal; and
wherein when the loop back control signal is deasserted,
the loop back reference clock multiplexer is operative to communicate the loop back reference clock multiplexer reference clock input signal to the loop back reference clock multiplexer output signal,
the loop back clock multiplexer is operative to communicate the loop back clock multiplexer clock input signal to the loop back clock multiplexer output signal, and
the loop back data multiplexer is operative to communicate the loop back data multiplexer parallel data input signal to the loop back data multiplexer parallel data output signal.

23. A circuit for performing a line loop back test, the circuit comprising:
a serializer that receives a serializer parallel data input signal and that generates a serializer serial data output signal;
a loop back data multiplexer that receives a loop back data multiplexer parallel data input signal and a loop back data multiplexer parallel loop back input signal and that generates a loop back data multiplexer parallel data output signal;
a loop back data buffer having a loop back data buffer parallel input signal and a loop back data buffer parallel output signal;
a deserializer that receives a deserializer serial data input signal and that generates a deserializer parallel data output signal, wherein the deserializer further generates a deserializer clock output signal; and
a loop back reference clock multiplexer that receives a loop back reference clock multiplexer reference clock input signal and a loop back reference clock multiplexer loop back input signal and that generates a loop back reference clock multiplexer clock output signal;
wherein the deserializer parallel data output signal is coupled to the loop back data buffer parallel input signal;
wherein the loop back data buffer parallel output signal is coupled to the loop back data multiplexer parallel loop back input signal;
wherein the loop back data multiplexer parallel data output signal is coupled to the serializer parallel data input signal;
wherein the deserializer clock output signal is coupled to the loop back reference clock multiplexer loop back input signal.

24. A circuit as in claim 23, further comprising:
a clock multiplier unit that receives a clock multiplier unit input signal and that generates a clock multiplier unit output signal;
wherein the serializer further receives a serializer clock input signal;
wherein the clock multiplier unit output signal is coupled to the serializer clock input signal.

25. A circuit as in claim 24,
wherein the loop back reference clock multiplexer clock output is coupled to the clock multiplier unit input signal.

26. A circuit as in claim 25, further comprising:
a loop back clock buffer that receives a loop back clock buffer input signal and that produces a loop back clock buffer output signal;
wherein the loop back clock buffer output signal is coupled to the loop back reference clock multiplexer loop back input signal; and
wherein the deserializer clock output signal is coupled to the loop back clock buffer input signal to provide the coupling of the deserializer clock output signal to the loop back reference clock multiplexer loop back input signal.

27. A circuit as in claim 26, further comprising:
a loop back control signal;
wherein the loop back reference clock multiplexer further receives a loop back reference clock multiplexer select signal;
wherein the loop back data multiplexer further receives a loop back data multiplexer select signal;
wherein the loop back control signal is coupled to the loop back reference clock multiplexer select signal and the loop back data multiplexer select signal.

28. A circuit as in claim 27,
wherein when the loop back control signal is asserted,
the loop back reference clock multiplexer is operative to communicate the loop back reference clock multiplexer loop back input signal to the loop back reference clock multiplexer output signal, and
the loop back data multiplexer is operative to communicate the loop back data multiplexer parallel loop back input signal to the loop back data multiplexer parallel data output signal; and
wherein when the loop back control signal is deasserted,
the loop back reference clock multiplexer is operative to communicate the loop back reference clock multiplexer reference clock input signal to the loop back reference clock multiplexer output signal, and
the loop back data multiplexer is operative to communicate the loop back data multiplexer parallel data input signal to the loop back data multiplexer parallel data output signal.

29. A circuit for performing a line loop back test, the circuit comprising:
a serializer that receives a serializer parallel data input signal and that generates a serializer serial data output signal;

a loop back data multiplexer that receives a loop back data multiplexer parallel data input signal and a loop back data multiplexer parallel loop back input signal and that generates a loop back data multiplexer parallel data output signal;

a deserializer that receives a deserializer serial data input signal and that generates a deserializer parallel data output signal, wherein the deserializer further generates a deserializer clock output signal; and a loop back reference clock multiplexer that receives a loop back reference clock multiplexer reference clock input signal and a loop back reference clock multiplexer loop back input signal and that generates a loop back reference clock multiplexer clock output signal;

wherein the deserializer parallel data output signal is coupled to the loop back data multiplexer parallel loop back input signal;

wherein the loop back data multiplexer parallel data output signal is coupled to the serializer parallel data input signal;

wherein the deserializer clock output signal is coupled to the loop back reference clock multiplexer loop back input signal.

30. A circuit as in claim 29 further comprising:

a clock multiplier unit that receives a clock multiplier unit input signal and that generates a clock multiplier unit output signal;

wherein the serializer further receives a serializer clock input signal;

wherein the clock multiplier unit output signal is coupled to the serializer clock input signal.

31. A circuit as in claim 30, wherein the loop back reference clock multiplexer clock output is coupled to the clock multiplier unit input signal.

32. A circuit as in claim 31, further comprising:

a loop back control signal;

wherein the loop back reference clock multiplexer further receives a loop back reference clock multiplexer select signal;

wherein the loop back data multiplexer further receives a loop back data multiplexer select signal;

wherein the loop back control signal is coupled to the loop back reference clock multiplexer select signal and the loop back data multiplexer select signal.

33. A circuit as in claim 32, wherein when the loop back control signal is asserted, the loop back reference clock multiplexer is operative to communicate the loop back reference clock multiplexer loop back input signal to the loop back reference clock multiplexer output signal, and the loop back data multiplexer is operative to communicate the loop back data multiplexer parallel loop back input signal to the loop back data multiplexer parallel data output signal; and wherein when the loop back control signal is deasserted, the loop back reference clock multiplexer is operative to communicate the loop back reference clock multiplexer reference clock input signal to the loop back reference clock multiplexer output signal, and the loop back data multiplexer is operative to communicate the loop back data multiplexer parallel data input signal to the loop back data multiplexer parallel data output signal.

34. A method of performing a line loop back test, the method comprising the steps of:

(a) receiving an input signal from a receiver communication line;

(b) converting high speed serial receiver data derived from an input signal into low speed parallel data, further comprises the step of:

(f) producing a low speed clock output signal;

(c) selecting by a low speed parallel loop back data multiplexer either the low speed parallel data or low speed parallel input data as low speed parallel output data;

(d) converting the low speed parallel output data into high speed serial transmitter data;

(e) converting the high speed serial transmitter data into an output signal for transmission across a transmitter communication line;

(g) selecting by a low speed loop back reference clock multiplexer either the low speed clock output signal or a reference clock input signal.

35. A method as in claim 34, further comprising the step of:

(h) converting a low speed output of step (g) into a high speed clock signal;

wherein step (d) comprises the step of:

(i) generating the high speed serial transmitter data in synchronization with the high speed clock signal.

36. A method as in claim 35, wherein a first-in-first-out buffer provides coupling between a serializer that performs step (d) and a low speed parallel loop back data multiplexer that performs step (c);

the method further comprising the step of:

selecting by a low speed loop back clock multiplexer coupled to the first-in-first-out buffer either the low speed clock output signal or a low speed clock input signal;

converting by a clock divider circuit coupled to the first-in-first-out buffer the high speed clock signal into a low speed FIFO output clock;

receiving by the first-in-first-out buffer the low speed parallel output data from a low speed parallel loop back data multiplexer in synchronization with a clock multiplexer output received from the low speed clock multiplexer; and transmitting by the first-in-first-out buffer low speed parallel FIFO data to the serializer in synchronization with the low speed FIFO output clock received from the clock divider.

37. A method as in claim 36, wherein a low speed loop back clock buffer provides coupling between the deserializer that performs step (f) and a low speed loop back reference clock multiplexer, and that provides coupling between the deserializer that performs step (f) and the low speed loop back clock multiplexer.

38. A method as in claim 34, wherein a low speed parallel loop back data buffer provides coupling between a deserializer that performs step (b) and a low speed parallel loop back data multiplexer that performs step (c).

39. A method as in claim 34, wherein a low speed loop back clock buffer provides coupling between a deserializer that performs step (f) and a low speed loop back reference clock multiplexer that performs step (g).

40. A method as in claim 34, wherein a clock and data recovery unit provides coupling between a receiver that performs step (a) and a deserializer that performs step (b).

* * * * *